United States Patent [19]
Arimoto

[11] Patent Number: 4,786,152
[45] Date of Patent: Nov. 22, 1988

[54] TELEPHOTO LENS SYSTEM

[75] Inventor: Tetsuya Arimoto, Sakai, Japan

[73] Assignee: Minolta Camera Kabushiki Kaisha, Osaka, Japan

[21] Appl. No.: 35,068

[22] Filed: Apr. 6, 1987

[30] Foreign Application Priority Data

Apr. 7, 1986 [JP] Japan .................. 61-79484

[51] Int. Cl.⁴ .............................................. G02B 13/02
[52] U.S. Cl. ..................................... 350/454; 350/457
[58] Field of Search ................ 350/454, 455, 456, 457

[56] References Cited

U.S. PATENT DOCUMENTS

| | | | |
|---|---|---|---|
| 4,483,597 | 11/1984 | Mihara | 350/454 |
| 4,527,868 | 7/1985 | Mihara | 350/454 |
| 4,558,928 | 12/1985 | Imaizumi | 350/454 |
| 4,610,514 | 9/1986 | Nakamura | 350/455 |

Primary Examiner—John K. Corbin
Assistant Examiner—Scott J. Sugarman
Attorney, Agent, or Firm—Price, Gess & Ubell

[57] ABSTRACT

A compact telephoto lens system with a large aperture whose aberrations are corrected well at any focusing position. This telephoto lens system consists of three lens units, namely a positive, a negative and a positive lens unit and only the negative lens unit moves for focusing.

4 Claims, 3 Drawing Sheets

TELEPHOTO LENS SYSTEM

BACKGROUND OF THE INVENTION

1. Field of the Invention

The present invention relates to a compact telephoto lens system with a large aperture.

2. Description of the Prior Art

Telephoto lens systems of this type which consist of three lens groups, namely a first positive, a second negative and a third positive lens group, and whose second lens group alone moves for focusing having been proposed for example in the following publications: Japanese Laid-Open Patent publications Nos. sho. 59-65820 and sho. 59-65821.

With the lens systems proposed in these Japanese publications, the first lens group consists of, from the object side, a first positive lens element, a second and a third positive meniscus lens element having a convex surface to the object and a fourth negative meniscus lens element. The third positive meniscus lens element and the fourth negative meniscus lens element are cemented with one another to leave no air space therebetween.

SUMMARY OF THE INVENTION

An object of the present invention is to provide a compact telephoto lens system with a large aperture, which is different from the conventional ones mentioned above in the construction of the first lens unit, particularly a space between the third and the fourth of the first lens unit, and which is well corrected with aberrations at any focusing position.

To achieve this object a telephoto lens system according to the present invention comprises a first positive lens unit (I), a second negative lens unit (II) and a third positive lens unit (III). The first lens unit (I) consists of a first component (I-1) which consists of, from the object side, a first positive lens element ($L_1$), a second and a third positive meniscus lens element ($L_2$, $L_3$) having a convex surface to the object side and a second component (I-2) which comprises a fourth negative meniscus lens element ($L_4$) having a convex surface to the object side. The second lens unit (II) includes cemented lens elements ($L_5$, $L_6$) and in case of focusing only this lens unit moves, namely to the image side upon focusing from an infinite to a close distance. This telephoto lens system fulfills the following conditions:

$$0.15 < r_6/r_7 < 0.85 \quad (1)$$

$$0.0045f < d_6 < 0.0105f \quad (2)$$

$$0.85 < f_{I-1}/|f_{I-2}| < 1 \quad (3)$$

wherein, $r_6$ represents the radius of curvature of the image side surface of the third lens element ($L_3$) of the first lens unit (I);

$r_7$ represents the radius of curvature of the object side surface of the fourth lens element ($L_4$) in the first lens unit (I);

$d_6$ represents the axial distance between the third and fourth lens element ($L_3$) ($L_4$) in the first lens unit (I);

f represent the whole focal length of the whole lens system when the lens system is in focus on an infinite object;

$f_{I-1}$ represents the compound focal length of the first component (I-1) of the first lens unit (I), and $f_{I-1}$ represents the focal length of the second component (I-2) iof the first lens unit (I).

If the radius of curvature of the image side surface ($r_6$) of the third lens element ($L_3$) becomes smaller in comparison with the radius of curvature of the object side surface ($r_7$) of the fourth lens element ($L_4$) beyond the lower limit of condition (1), aberrations in high degrees are produced. On the contrary, if the radius of curvature of the image side surface ($r_6$) of the third lens element ($L_3$) becomes greater in comparison with the radius of curvature of the object side surface ($r_7$) of the fourth lens element ($L_4$) beyond the upper limit of condition (1), and thus the difference between the radii of curvature of the surfaces ($r_6$) ($r_7$) becomes small, coma cannot be corrected well.

Condition (2) limits the axial distance between the image side surface ($r_6$) of the third lens element ($L_3$) and the object side surface ($r_7$) of the fourth lens element ($L_4$). If this axial distance becomes smaller beyond the lower limit of condition (2), a space which makes the difference between the radii of curvature of the above mentioned two surfaces required for correcting coma cannot be assured. In contrast thereto, if this axial distance between the two surfaces becomes greater beyond the upper limit of condition (2), astigmatic difference and chromatic coma are produced.

Condition (3) defines that the ratio of the compound focal length of the first positive component (I-1) and the absolute value of the focal length of the second negative component should be nearly 1. According to this invention as the first component (I-1) as a whole can be regarded as a positive meniscus lens element, whereas the second component (I-2) is a negative meniscus element, so that the distance between the principal points at these components can be made long so that the compound focal length of the first lens unit can be set to a great value even if the above ratio is set to nearly 1.

When the above mentioned ratio is nearly 1, aberrations produced both by the positive and negative component (I-1, I-2) can be corrected and well-balanced. If the compound focal length of the first component (I-1) becomes small in comparison with the absolute value of the focal length of the second component (I-2) beyond the lower limit of condition (3), the positive refractive power of the first lens unit (I) becomes too great, so that spherical aberration, distortion and chromatic aberration become remarkable, resulting in difficulty in providing the lens system with a large aperture.

On the other hand, if the compound focal length of the first component (I-1) becomes great in comparison with the absolute value of the focal length of the second component (I-2) beyond the upper limit of condition (3), the compound focal length of the first lens unit (I) becomes so great that the lens system cannot be compactized.

Furthermore, it is desirable when the present invention that at least one positive lens element of the first lens unit (I) fulfills the following condition.

$$\theta > 0.53, \nu > 75 \quad (4)$$

wherein, $\theta$ represents partial dispersion ratio ($= n_g - n_m/n_f - n_c$) and $\nu$ represents the Abbe number.

It is also desirable that the cemented lens elements ($L_5$) ($L_6$) of the second lens unit (II) fulfill the following conditons:

$$\nu_a - \nu_b > 20 \tag{5}$$

$$500f < r_{ab}/n_b - n_a < 1600f \tag{6}$$

wherein, $\nu_a$ represents the Abbe number of the positive lens element of the cemented lens elements ($L_5$) ($L_6$) of the second lens unit (II);

$\nu_b$ represents the Abbe number of the negative lens element ($L_5$) of the cemented lens elements of the second lens unit;

$n_a$ represents the refractive index of the positive lens element of the cemented lens elements of the second lens unit;

$n_b$ represents the refractive index of the negative lens element of the cemented lens elements of the second lens unit and $r_{ab}$ represents the radius of curvature of the cemented surfaces of the cemented lens elements of the second lens unit.

Condition (4) relates to correction of chromatic aberration which serves to deteriorate the imaging definition of a telephoto lens system very much. Chromatic aberration can be decreased to a large extent when at least one positive lens element consists of an anomalous dispersion glass fulfilling condition (4). Use of such an anomalous dispersion glass makes it possible to correct chromatic aberration well even with the refractive power of the first component (I) being small, and thus it is advantageous also for correction of monochromatic aberration. With the lens system of the present invention, as focusing is effected by movement of the second lens unit (II), any change of aberrations due to the movement of the second lens unit (II) should be kept small. To this end, it is desirable that the cemented lens elements ($L_5$) ($L_6$) of the second lens unit (II) fulfill the conditions (5) and (6).

If the value of the condition (5) of the glass material of the cemented lens elements exceeds the limit, chromatic aberration can change too much in a case of focusing.

If the refractive power of the cemented surfaces become greater than the upper limit of condition (6), lateral chromatic aberration and coma can change too much in a case of focusing. On the other hand, if the refractive power of the cemented surfaces becomes smaller than the lower limit of condition (6), longitudinal chromatic aberration can change too much to be hardly restrained within a permissible range.

It is further desirable that the lens system according to this invention fulfills the following conditions.

$$0.55f < f_I < 0.85f \tag{7}$$

$$t_{I\,II} < t_{II\,III} \tag{8}$$

wherein, $f_I$ represents the compound focal length of the first lens unit (I) and $t_{ij}$ represents the axial distance between the lens unit (i) and the lens group (j).

Condition (7) is for minimization of the change of aberrations by movement of the second lens unit (II), realization of a large aperture and compactization of the lens system. If the compound focal length of the first lens unit (I) becomes small beyond the lower limit of condition (7), spherical aberration and chromatic aberration caused by the first lens unit (I) increase so much to make it difficult to provide the lens system with a large aperture. On the contrary, if the compound focal length of the first lens unit (I) becomes great beyond the upper limit of condition (7), the total length of the lens system increases to such an extent that compactization of the lens system cannot be realized. Furthermore, when the compound focal length of the first lens unit (I) is kept within the range of condition (7), it becomes possible to arrange the second lens unit (II) near the intersection of an off-axial principal ray and the optical axis, so that the change of off-axis aberration caused by movement of the second lens unit (II) in case of focusing can be minimized. Still further, when the diaphragm is arranged just in front of the second lens unit (II), the diaphragm need not move and can allow both axial rays and off axial rays to pass therethrough for any object distance.

Condition (8) limits the axial distance between the second and third lens unit (II, III), when the second lens unit is arranged at the above said position. If the condition (8) is violated, an air space required for movement of the second lens unit (II) can not be assured and distortion and astigmatism are not corrected well.

The features of the present invention which are believed to be novel are set forth with particularity in the appended claims. The present invention may best be understood by reference to the following description, taken in conjunction with the accompanying drawings.

DETAILED DESCRIPTION OF THE PREFERRED EMBODIMENTS

The following description is provided to enable any person skilled in the optical and camera field to make and use the invention and sets forth the best modes contemplated by the inventor for carrying out his invention. Various modifications, however, will remain readily apparent to those skilled in the art, since the generic principles of the present invention has been defined herein specifically to provide a relatively economical and easily manufactured telephoto lens system. The derivation of the formulas and the relation of the powers set forth herein can be accomplished with the assistance of a computer. The present invention represents the parameters of a compromise balance of acceptable aberrations which can be relatively easily manufactured to provide a telephoto lens system.

Figure 1:
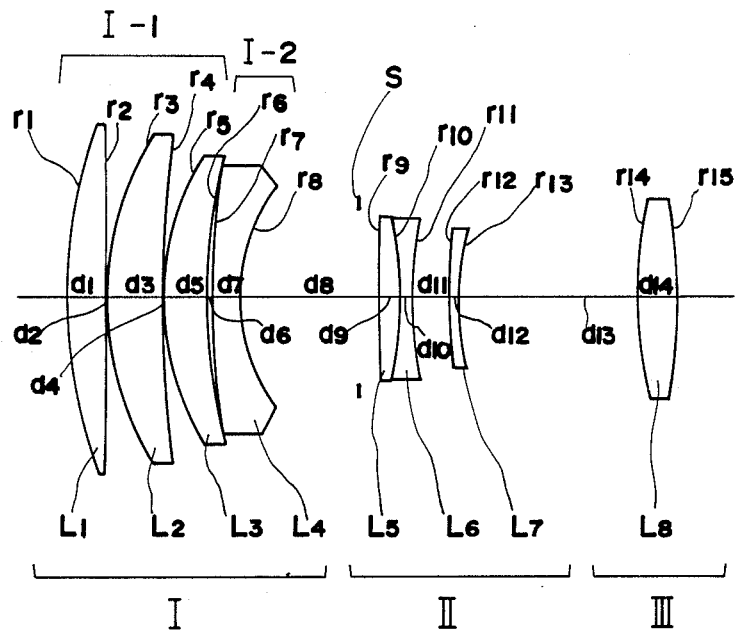
FIG. 1 is a cross sectional view of a lens system according to embodiment 1 of the present invention.
Figure 2A:
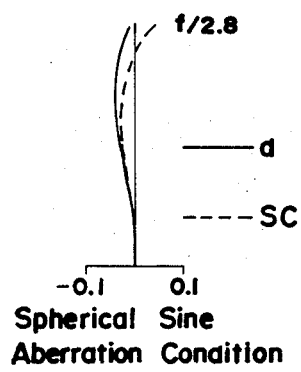
FIGS. 2A to 2C represent the aberration curves of embodiment 1 when the lens system is in focus on an infinite object.
Figure 2B:
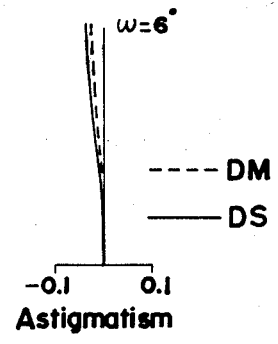
Figure 2C:
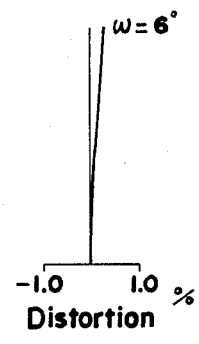
Figure 3A:
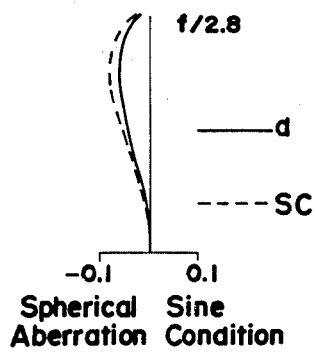
FIGS. 3A to 3C represent the aberration curves of the embodiment 1 when the lens system is in focus on a close object with magnification $\beta = -0.1$.
Figure 3B:
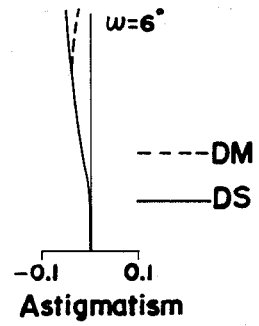
Figure 3C:
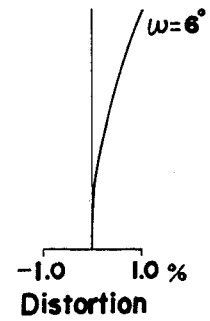
Figure 4:
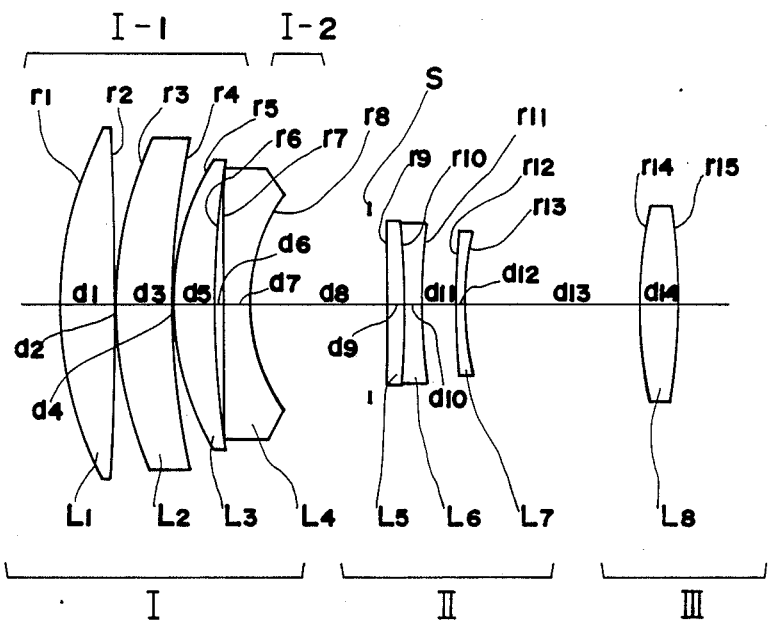
FIG. 4 is a cross sectional view of a lens system according to embodiment 2 of the present invention.
Figure 5A:
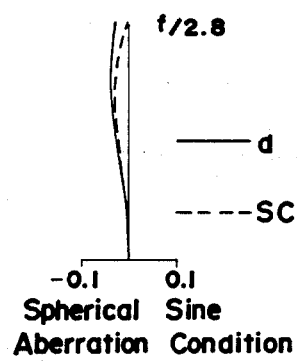
FIGS. 5A to 5C represent the aberration curves of embodiment 2 when the lens system is in focus on an infinite object.
Figure 5B:
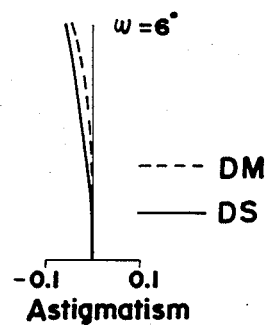
Figure 5C:
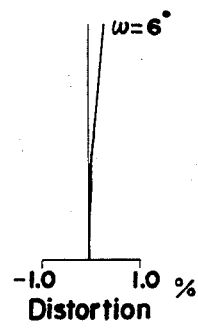
Figure 6A:
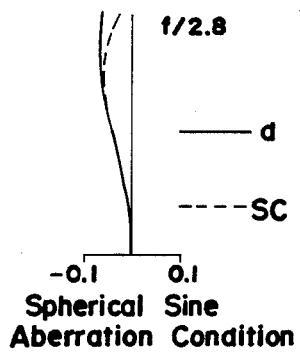
FIGS. 6A to 6C represent the aberration curves of the embodiment 2 when the lens system is in focus on a close object with magnification $\beta = -0.1$.
Figure 6B:
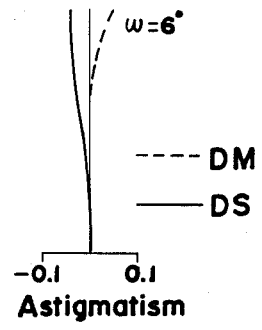
Figure 6C:
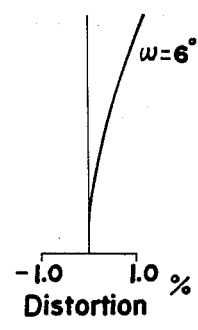
Figure 7:
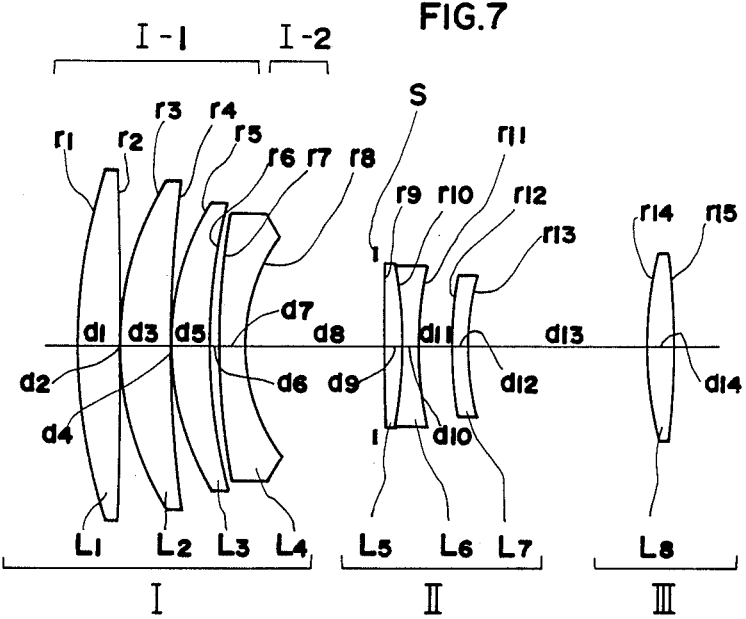
FIG. 7 is a cross sectional view of a lens system according to embodiment 3 of the present invention.
Figure 8A:
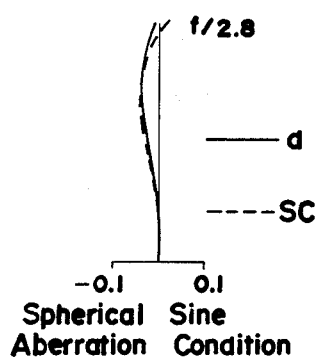
FIGS. 8A to 8C represent the aberration curves of embodiment 3 when the lens system is in focus on an infinite object.
Figure 8B:
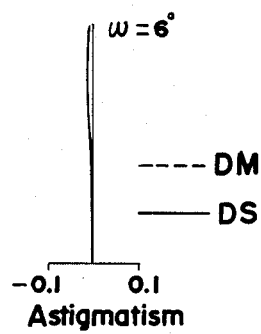
Figure 8C:
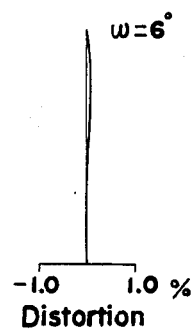
Figure 9A:
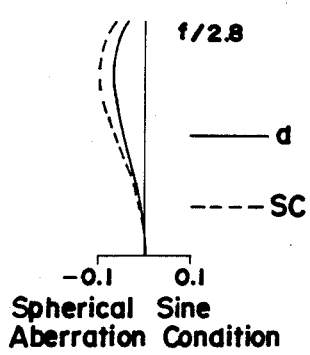
FIGS. 9A to 9C represent the aberration curves of the embodiment 3 when the lens system is in focus on a close object with magnification $\beta = -0.1$.
Figure 9B:
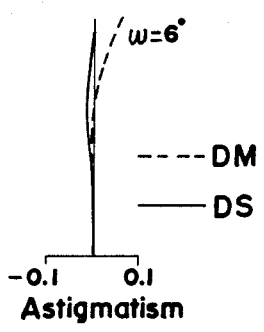
Figure 9C:
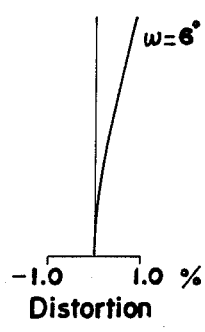

In the drawings, FIGS. 1, 4 and 7 show the position of the lens elements and the schematic cross sectional views of respective embodiments follow the normal conventions of an object at the left-hand side of the drawings and the image plane at the right-hand side.

The following Tables 1 to 3 disclose, respectively design parameters of embodiments 1 to 3 of the present invention. In the embodiments $L_1, L_2, L_3, \ldots$ is respectively the lens element from the object side, $r_1, r_2, r_3, \ldots$ is respectively the axial thickness including both air spaces and the actual thickness of a lens element. $N_1, N_2, N_3, \ldots$ is respectively the refractive index of the first through eighth lens element and $\nu_1, \nu_2, \nu_3, \ldots$ is respectively the Abbe number of the first through eighth lens element. $\theta_1 \neq$ and $\theta_2$ is the partial dispersion ratio.

I, II and III represents respectively the first, second and third lens unit. I-1 and I-2 is respectively the first and second component of the first lens unit (I). Values in tables are those when the lens system is in focus on an infinite object. With magnification $\beta = -0.1$ the second lens unit (II) moves upon focusing from an infinite distance to a close distance to the image side 5.756, 6.947 and 5.389 mm respectively in the embodiment 1, 2, and 3.

TABLE 1

[Embodiment 1]

$f = 100.0 \quad 2\omega = 12° \quad$ F No. = 2.8

| radius of curvature | | axial distance | refractive index | Abbe number | partial dispersion ratio |
|---|---|---|---|---|---|
| $r_1$ | 48.621 | | | | |
| | | $d_1$ 3.985 | $N_1$ 1.49310 | $\nu_1$ 83.55 | $\theta_1 = 0.539$ |
| $r_2$ | −1726.727 | | | | |
| | | $d_2$ 0.152 | | | |
| $r_3$ | 30.667 | | | | |
| | | $d_3$ 5.670 | $N_2$ 1.49310 | $\nu_2$ 83.55 | $\theta_1 = 0.539$ |
| $r_4$ | 125.435 | | | | |
| | | $d_4$ 0.169 | | | |
| $r_5$ | 26.820 | | | | |
| | | $d_5$ 4.305 | $N_3$ 1.69350 | $\nu_3$ 50.29 | |
| $r_6$ | 55.733 | | | | |
| | | $d_6$ 0.670 | | | |
| $r_7$ | 90.578 | | | | |
| | | $d_7$ 2.758 | $N_4$ 1.72100 | $\nu_4$ 33.40 | |
| $r_8$ | 17.607 | | | | |
| | | $d_8$ 14.159 | | | |
| $r_9$ | 216.668 | | | | |
| | | $d_9$ 2.063 | $N_5$ 1.75520 | $\nu_5$ 27.51 | |
| $r_{10}$ | −47.674 | | | | |
| | | $d_{10}$ 1.547 | $N_6$ 1.72000 | $\nu_6$ 50.31 | |
| $r_{11}$ | 41.739 | | | | |
| | | $d_{11}$ 3.550 | | | |
| $r_{12}$ | 59.969 | | | | |
| | | $d_{12}$ 1.039 | $N_7$ 1.58144 | $\nu_7$ 40.89 | |
| $r_{13}$ | 27.622 | | | | |
| | | $d_{13}$ 18.164 | | | |
| $r_{14}$ | 37.680 | | | | |
| | | $d_{14}$ 4.096 | $N_8$ 1.48749 | $\nu_8$ 70.44 | |
| $r_{15}$ | −87.467 | | | | |

$\Sigma d = 62.326$
$r_6/r_7 = 0.615$
$d_6 = 0.00670$
$f_{I-1}/|f_{I-2}| = 0.912$
$\nu d - \nu a = 22.8$ TABLE 1-continued

[Embodiment 1]

$$\frac{rab}{nb - na} = 1354$$

TABLE 2

[Embodiment 2]

$f = 100.0 \quad 2\omega = 12° \quad$ F No. = 2.8

| radius of curvature | | axial distance | refractive index | Abbe number | partial dispersion ratio |
|---|---|---|---|---|---|
| $r_1$ | 36.354 | | | | |
| | | $d_1$ 5.665 | $N_1$ 1.49310 | $\nu_1$ 83.55 | $\theta_1 = 0.539$ |
| $r_2$ | −393.742 | | | | |
| | | $d_2$ 0.152 | | | |
| $r_3$ | 40.866 | | | | |
| | | $d_3$ 5.670 | $N_2$ 1.51680 | $\nu_2$ 64.20 | |
| $r_4$ | 73.223 | | | | |
| | | $d_4$ 0.169 | | | |
| $r_5$ | 26.820 | | | | |
| | | $d_5$ 4.091 | $N_3$ 1.58913 | $\nu_3$ 61.11 | |
| $r_6$ | 84.560 | | | | |
| | | $d_6$ 0.928 | | | |
| $r_7$ | 416.813 | | | | |
| | | $d_7$ 2.681 | $N_4$ 1.62588 | $\nu_4$ 35.70 | |
| $r_8$ | 18.326 | | | | |
| | | $d_8$ 14.168 | | | |
| $r_9$ | 2276.659 | | | | |
| | | $d_9$ 2.108 | $N_5$ 1.75000 | $\nu_5$ 25.14 | |
| $r_{10}$ | −79.897 | | | | |
| | | $d_{10}$ 1.546 | $N_6$ 1.64050 | $\nu_6$ 60.08 | |
| $r_{11}$ | 48.627 | | | | |
| | | $d_{11}$ 3.544 | | | |
| $r_{12}$ | 55.161 | | | | |
| | | $d_{12}$ 1.035 | $N_7$ 1.56732 | $\nu_7$ 42.84 | |
| $r_{13}$ | 27.732 | | | | |
| | | $d_{13}$ 18.134 | | | |
| $r_{14}$ | 41.398 | | | | |
| | | $d_{14}$ 4.096 | $N_8$ 1.48749 | $\nu_8$ 70.44 | |
| $r_{15}$ | −68.776 | | | | |

$\Sigma d = 63.986$
$r_6/r_7 = 0.203$
$d_6 = 0.00928$
$f_{I-1}/|f_{I-2}| = 0.955$
$\nu d - \nu a = 34.8$ $$\frac{rab}{nb - na} = 730$$

TABLE 3

[Embodiment 3]

$f = 100.0 \quad 2\omega = 12° \quad$ F No. = 2.8

| radius of curvature | | axial distance | refractive index | Abbe number | partial dispersion ratio |
|---|---|---|---|---|---|
| $r_1$ | 48.554 | | | | |
| | | $d_1$ 4.716 | $N_1$ 1.49310 | $\nu_1$ 83.55 | $\theta_1 = 0.539$ |
| $r_2$ | −2117.925 | | | | |
| | | $d_2$ 0.149 | | | |
| $r_3$ | 30.998 | | | | |
| | | $d_3$ 5.155 | $N_2$ 1.49310 | $\nu_2$ 83.55 | $\theta_1 = 0.539$ |
| $r_4$ | 119.750 | | | | |
| | | $d_4$ 0.170 | | | |
| $r_5$ | 25.569 | | | | |
| | | $d_5$ 3.923 | $N_3$ 1.72000 | $\nu_3$ 52.14 | |
| $r_6$ | 55.581 | | | | |
| | | $d_6$ 0.979 | | | |
| $r_7$ | 86.000 | | | | |
| | | $d_7$ 2.763 | $N_4$ 1.72100 | $\nu_4$ 33.40 | |
| $r_8$ | 17.497 | | | | |
| | | $d_8$ 14.155 | | | |
| $r_9$ | 225.293 | | | | |
| | | $d_9$ 2.062 | $N_5$ 1.75520 | $\nu_5$ 27.51 | |
| $r_{10}$ | −43.717 | | | | |
| | | $d_{10}$ 1.546 | $N_6$ 1.72000 | $\nu_6$ 50.31 | |
| $r_{11}$ | 30.576 | | | | |
| | | $d_{11}$ 3.546 | | | |

TABLE 3-continued

[Embodiment 3]

| | | | | | |
|---|---|---|---|---|---|
| $r_{12}$ | 58.834 | | | | |
| | | $d_{12}$ | 1.546 | $N_7$ 1.58144 | $\nu_7$ 40.89 |
| $r_{13}$ | 26.454 | | | | |
| | | $d_{13}$ | 18.159 | | |
| $r_{14}$ | 35.637 | | | | |
| | | $d_{14}$ | 2.835 | $N_8$ 1.48749 | $\nu_8$ 70.44 |
| $r_{15}$ | −87.468 | | | | |

$\Sigma d = 61.706$
$r_6/r_7 = 0.646$
$d_6 = 0.00978$
$f_{I-1}/|f_{I-2}| = 0.900$
$\nu b - \nu a = 22.8$ $$\frac{rad}{nb - na} = 1242$$

What is claimed is:

1. A telephoto lens system comprising:
   (a) a first positive lens unit consisting of
      a first component which consists of, from the object side, a first positive lens element, a second and a third positive meniscus lens element having a convex surface to the object side; and
      a second component which comprises a fourth negative meniscus lens element having a convex surface to the object side;
   (b) a second negative lens unit including cemented elements with a positive and a negative lens element, the second lens unit alone moving in case of focusing, namely to the image side upon focusing from an infinite to a close distance; and
   (c) a third positive lens unit, wherein the telephoto lens system fulfills the following conditions:

$0.15 < r_6/r_7 < 0.85$ $0.0045f < d_6 < 0.0105f$ $0.85 < f_{I-1}/|f_{I-2}| < 1$ wherein,
   $r_6$ represents the radius of curvature of the image side surface of the third lens element of the first lens unit;
   $r_7$ represents the radius of curvature of the object side surface of the fourth lens element in the first lens unit;
   $d_6$ represents the axial distance between the third and fourth lens elements in the first lens unit;

f represents the whole focal length of the whole lens system when the lens system is in focus on an infinite object;
   $f_{I-1}$ represents the compound focal length of the first component of the first lens unit, and
   $f_{I-2}$ represents the compound focal length of the second component of the first lensunit.

2. A telephoto lens system as claimed in claim 1, wherein at least one positive lens element of the first lens unit fulfills the following conditions:

$\theta > 0.53, \nu > 75$ wherein,
   $\theta$ represents a partial dispersion ratio $(= n_g - n_f/n_f - n_c)$ and
   $\nu$ represents an Abbe number.

3. A telephoto lens system as claimed in claim 2, wherein the cemented lens elements of the second lens unit fulfill the following conditions:

$V_a - V_b > 20$ $500f < r_{ab}/n_b - n_a < 1600f$ wherein,
   $V_a$ represents an Abbe number of the positive lens element of the cemented lens elements of the second lens unit;
   $V_b$ represents an Abbe number of the negative lens element of the cemented lens elements of the second lens unit;
   $n_a$ represents a refractive index of the positive lens element of the cemented lens elements of the second lens unit;
   $n_b$ represents a refractive index of the negative lens element of the cemented lens elements of the second lens unit, and
   $r_{ab}$ represents the radius of curvature of the cemented surfaces of the cemented lens elements of the second lens unit.

4. A telephoto lens system as claimed in claim 3, wherein the telephoto lens system fulfills following conditions:

$0.55f < f_I < 0.85f$ $t_{I\ II} < t_{II\ III}$ wherein,
   $f_1$ represents the compound focal length of the first lens unit and
   $t_{ij}$ represents the axial distance between the lens unit (i) and the lens group (j).

* * * * *